United States Patent
Sieber et al.

(10) Patent No.: US 10,012,725 B2
(45) Date of Patent: Jul. 3, 2018

(54) SYSTEMS, METHODS, AND APPARATUS FOR LIVING OBJECT PROTECTION HAVING EXTENDED FUNCTIONALITY IN WIRELESS POWER TRANSFER APPLICATIONS

(71) Applicant: QUALCOMM Incorporated, San Diego, CA (US)

(72) Inventors: Lukas Sieber, Olten (CH); Grzegorz Krzysztof Ombach, Munich (DE); Hans Peter Widmer, Wohlenschwil (CH); Markus Bittner, Sarmenstorf (CH); Bernward Dimke, Munich (DE); Swagat Chopra, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 14/817,813

(22) Filed: Aug. 4, 2015

(65) Prior Publication Data

US 2016/0178740 A1 Jun. 23, 2016

Related U.S. Application Data

(60) Provisional application No. 62/094,836, filed on Dec. 19, 2014.

(51) Int. Cl.
*G01S 13/04* (2006.01)
*G01S 13/08* (2006.01)
(Continued)

(52) U.S. Cl.
CPC ............. *G01S 13/08* (2013.01); *B60L 11/182* (2013.01); *B60L 11/1829* (2013.01);
(Continued)

(58) Field of Classification Search
CPC ................ B60L 11/182; B60L 11/1829; B60L 11/1833; B60L 11/1838; G01S 13/04;
(Continued)

(56) References Cited

U.S. PATENT DOCUMENTS

| 7,567,200 B1 | 7/2009 | Osterweil |
| 8,855,554 B2 | 10/2014 | Cook et al. |

(Continued)

FOREIGN PATENT DOCUMENTS

| JP | 5509883 B2 | 6/2014 |
| WO | WO-200131604 A1 | 5/2001 |

OTHER PUBLICATIONS

International Search Report and Written Opinion—PCT/US2015/061948—ISA/EPO—dated Feb. 22, 2016.

*Primary Examiner* — Timothy A Brainard
(74) *Attorney, Agent, or Firm* — Knobbe, Martens, Olson & Bear, LLP

(57) ABSTRACT

Systems, methods, and apparatus for living object protection having extended functionality in wireless power transfer applications are provided. In one aspect, an apparatus for detecting objects in a detection area near a wireless power transfer system is provided. The apparatus comprises a plurality of radar transceivers integrated into a wireless power transmitter, each transceiver configured to transmit and receive radar signals. The apparatus comprises at least one processor configured to receive radar data from the plurality of radar transceivers. The processor is configured to compare responses in the received radar data from each of the plurality of radar transceivers. The processor is configured to determine a presence of a vehicle at a first distance from the plurality of radar transceivers based at least in part on a correlation of the responses in the received radar data from each of the plurality of radar transceivers. The processor is configured to filter portions of the received radar data (Continued)

corresponding to movement within a predetermined range of distances from the plurality of radar transceivers that includes the first distance.

30 Claims, 8 Drawing Sheets

(51) Int. Cl.
| | |
|---|---|
| *G01S 13/74* | (2006.01) |
| *B60L 11/18* | (2006.01) |
| *G01S 7/41* | (2006.01) |
| *G01S 13/56* | (2006.01) |
| *G01S 13/75* | (2006.01) |
| *G01S 13/87* | (2006.01) |
| *G01S 13/88* | (2006.01) |

(52) U.S. Cl.
CPC ....... *B60L 11/1833* (2013.01); *B60L 11/1838* (2013.01); *G01S 7/415* (2013.01); *G01S 13/04* (2013.01); *G01S 13/56* (2013.01); *G01S 13/74* (2013.01); *G01S 13/751* (2013.01); *G01S 13/878* (2013.01); *G01S 13/88* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
CPC .......... G01S 13/08; G01S 13/56; G01S 13/74; G01S 13/751; G01S 13/878; G01S 13/88; G01S 7/415; Y02T 10/7005; Y02T 10/7072; Y02T 90/121; Y02T 90/122; Y02T 90/125; Y02T 90/128; Y02T 90/14; Y02T 90/163
USPC .................................................. 342/43, 145
See application file for complete search history.

(56) References Cited

U.S. PATENT DOCUMENTS

| | | | |
|---|---|---|---|
| 2009/0261979 A1* | 10/2009 | Breed ...................... | B60J 10/00 340/576 |
| 2011/0248861 A1* | 10/2011 | Corrado ................. | G01B 21/26 340/666 |
| 2012/0146833 A1* | 6/2012 | Pawlitzki ................ | G01S 7/003 342/37 |
| 2013/0078968 A1 | 3/2013 | Breed et al. | |
| 2013/0113653 A1* | 5/2013 | Kishigami .............. | G01S 7/285 342/189 |
| 2014/0015522 A1 | 1/2014 | Widmer et al. | |
| 2014/0035526 A1 | 2/2014 | Tripathi et al. | |
| 2014/0132208 A1* | 5/2014 | Fisher .................... | H02J 5/005 320/108 |
| 2014/0203768 A1 | 7/2014 | Andic et al. | |
| 2014/0333256 A1 | 11/2014 | Widmer et al. | |
| 2015/0260835 A1 | 9/2015 | Widmer et al. | |
| 2015/0364944 A1 | 12/2015 | Briz et al. | |
| 2016/0109564 A1 | 4/2016 | Sieber et al. | |

\* cited by examiner

SYSTEMS, METHODS, AND APPARATUS FOR LIVING OBJECT PROTECTION HAVING EXTENDED FUNCTIONALITY IN WIRELESS POWER TRANSFER APPLICATIONS

CLAIM OF PRIORITY UNDER 35 U.S.C. § 119

This application claims priority to Provisional Application No. 62/094,836 entitled "SYSTEMS, METHODS, AND APPARATUS FOR LIVING OBJECT PROTECTION HAVING EXTENDED FUNCTIONALITY IN WIRELESS POWER TRANSFER" filed Dec. 19, 2014. The disclosure of Provisional Application No. 62/094,836 is hereby expressly incorporated in its entirety by reference herein.

FIELD

The present disclosure relates generally to wireless power transfer, and more specifically to systems, methods and apparatuses for living object protection having extended functionality in wireless power transfer applications.

BACKGROUND

Inductive power transfer (IPT) systems provide one example of wireless transfer of energy. In IPT systems, a primary power device (or "transmitter") transmits power wirelessly to a secondary power device (or "receiver"). Each of the transmitter and receiver includes an inductive coupler, typically a single or multi-coil arrangement of windings comprising electric current conveying materials, such as Litz wire. An alternating current passing through a primary coupler produces an alternating magnetic field. When a secondary coupler is placed in proximity to the primary coupler, the alternating magnetic field induces an electromotive force (EMF) in the secondary coupler according to Faraday's law, thereby wirelessly transferring power to the receiver.

Inductive power transfer to electrically chargeable vehicles at power levels of several kilowatts in both domestic and public parking zones may require special protective measures for safety of persons and equipment in proximity. Such measures may include detection of moving objects in the critical space of the IPT system. This may be particularly true for systems where the critical space is open and accessible. Such measures may also include detection of living objects, (e.g., humans, extremities of humans, or animals) to protect them from exposure to such strong electromagnetic fields.

The critical space of an IPT system may be defined as the space where electromagnetic field levels exceed certain critical levels. These levels may be based on regulatory limits for human exposure, magnetic flux density limits determined by eddy current heating effects in foreign metallic objects, or other limits such as those specified by a standard applicable to a particular product or to a particular use case. As economic pressures push desired costs for such IPT systems to ever-lower levels, it may be desirable for living object protection systems to provide functions and features beyond those of only living object protection. As such, systems, methods and apparatuses for living object protection having extended functionality in wireless power transfer applications are desirable.

SUMMARY

Some implementations provide an apparatus for detecting objects in a detection area near a wireless power transfer system. The apparatus comprises a plurality of radar transceivers integrated into a wireless power transmitter. Each transceiver is configured to transmit and receive radar signals. The apparatus further comprises at least one processor configured to receive radar data from the plurality of radar transceivers. The processor is further configured to compare responses in the received radar data from each of the plurality of radar transceivers. The processor is further configured to determine a presence of a vehicle at a first distance from the plurality of radar transceivers based at least in part on a correlation of the responses in the received radar data from each of the plurality of radar transceivers. The processor is further configured to filter portions of the received radar data corresponding to movement within a predetermined range of distances from the plurality of radar transceivers that includes the first distance when further detecting objects in the detection area.

Some other implementations provide a method for detecting objects in a detection area near a wireless power transfer system. The method comprises receiving radar data from a plurality of radar transceivers. The method comprises comparing responses in the received radar data from each of the plurality of radar transceivers. The method comprises determining a presence of a vehicle at a first distance from the plurality of radar transceivers based at least in part on a correlation of the responses in the received radar data from each of the plurality of radar transceivers. The method comprises filtering portions of the received radar data corresponding to movement within a predetermined range of distances from the plurality of radar transceivers that includes the first distance when further detecting objects in the detection area.

Yet other implementations provide a non-transitory, computer-readable medium comprising code that, when executed, causes an apparatus to receive radar data from a plurality of radar transceivers. The code, when executed, further causes the apparatus to compare responses in the received radar data from each of the plurality of radar transceivers. The code, when executed, further causes the apparatus to determine a presence of a vehicle at a first distance from the plurality of radar transceivers based at least in part on a correlation of the responses in the received radar data from each of the plurality of radar transceivers. The code, when executed, further causes the apparatus to filter portions of the received radar data corresponding to movement within a predetermined range of distances from the plurality of radar transceivers that includes the first distance when further detecting objects in the detection area.

Yet other implementations provide an apparatus for detecting objects in a detection area near a wireless power transfer system. The apparatus comprises a plurality of means for transmitting and receiving radar signals. The apparatus comprises means for receiving radar data from the plurality of means for transmitting and receiving radar signals. The apparatus comprises means for comparing responses in the received radar data from each of the plurality of means for transmitting and receiving radar signals. The apparatus comprises means for determining a presence of a vehicle at a first distance from the plurality of means for transmitting and receiving radar signals based at least in part on a correlation of the responses in the received radar data from each of the plurality of means for transmitting and receiving radar signals. The apparatus further comprises means for filtering portions of the received radar data corresponding to movement within a predetermined range of distances from the plurality of means for transmitting and receiving radar signals that includes the first distance when further detecting objects in the detection area.

DETAILED DESCRIPTION

The detailed description set forth below in connection with the appended drawings is intended as a description of exemplary implementations and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
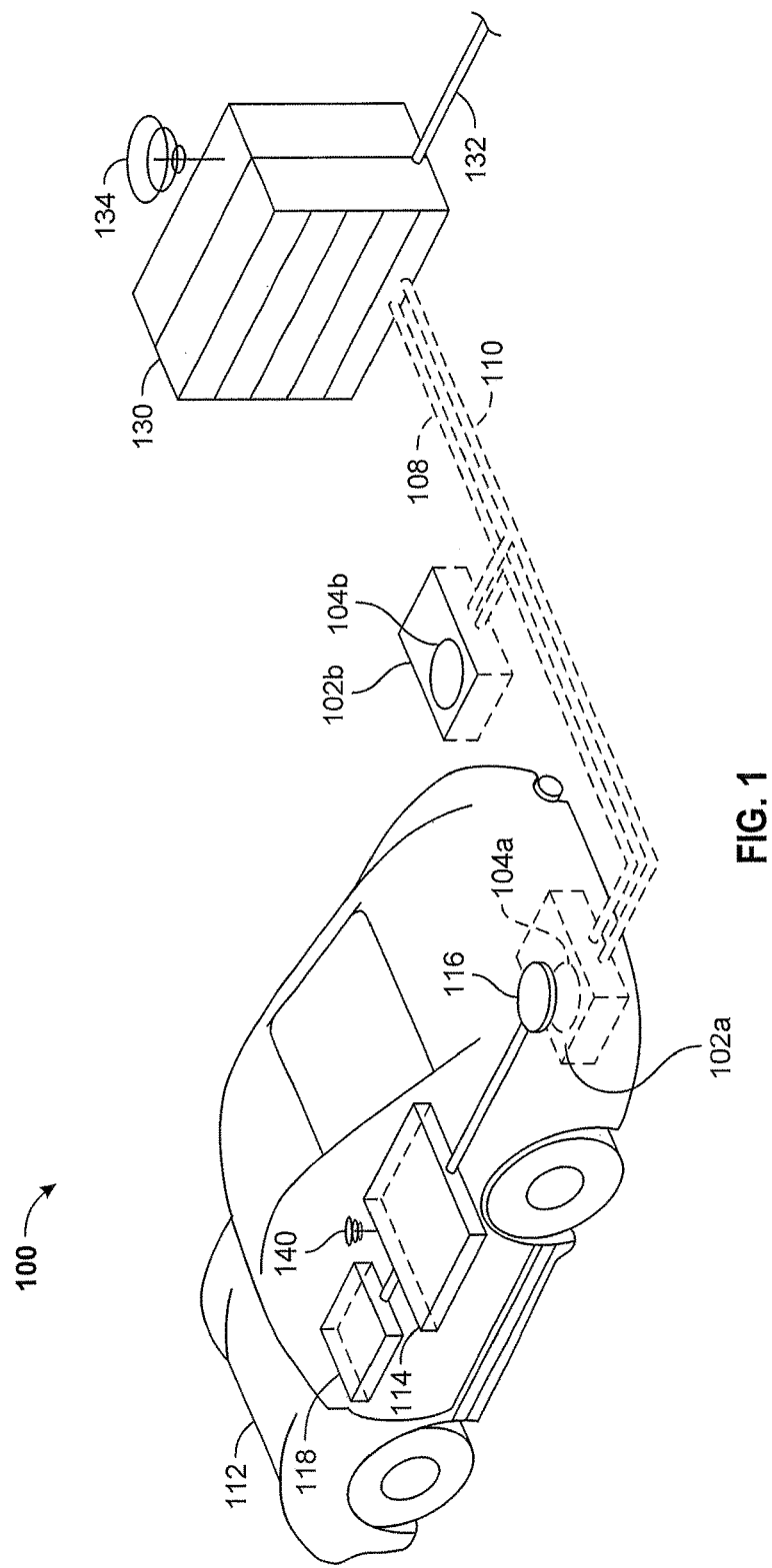
FIG. 1 illustrates an exemplary wireless power transfer system for charging an electric vehicle, in accordance with some exemplary implementations.

FIG. 1 is a diagram of an exemplary wireless power transfer system 100 for charging an electric vehicle, in accordance with some exemplary implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base coupler 104a and 104b, respectively, for wirelessly transferring power. In some other implementations (not shown in FIG. 1), base couplers 104a or 104b may be stand-alone physical units and are not part of the base wireless charging system 102a or 102b.

The electric vehicle 112 may include a battery unit 118, an electric vehicle coupler 116, and an electric vehicle wireless charging unit 114. The electric vehicle wireless charging unit 114 and the electric vehicle coupler 116 constitute the electric vehicle wireless charging system. In some diagrams shown herein, the electric vehicle wireless charging unit 114 is also referred to as the vehicle charging unit (VCU). The electric vehicle coupler 116 may interact with the base coupler 104a for example, via a region of the electromagnetic field generated by the base coupler 104a.

In some exemplary implementations, the electric vehicle coupler 116 may receive power when the electric vehicle coupler 116 is located in an electromagnetic field produced by the base coupler 104a. The field may correspond to a region where energy output by the base coupler 104a may be captured by the electric vehicle coupler 116. For example, the energy output by the base coupler 104a may be at a level sufficient to charge or power the electric vehicle 112. In some cases, the field may correspond to a "near-field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about $\frac{1}{2}\pi$ of a wavelength of the a frequency of the electromagnetic field produced by the base coupler 104a distant from the base coupler 104a, as will be further described below.

Local distribution center 130 may be configured to communicate with external sources (e.g., a power grid) via a communication backhaul 134, and with the base wireless charging system 102a via a communication link 108.

In some implementations the electric vehicle coupler 116 may be aligned with the base coupler 104a and, therefore, disposed within a near-field region simply by the electric vehicle operator positioning the electric vehicle 112 such that the electric vehicle coupler 116 is sufficiently aligned relative to the base coupler 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the couplers 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
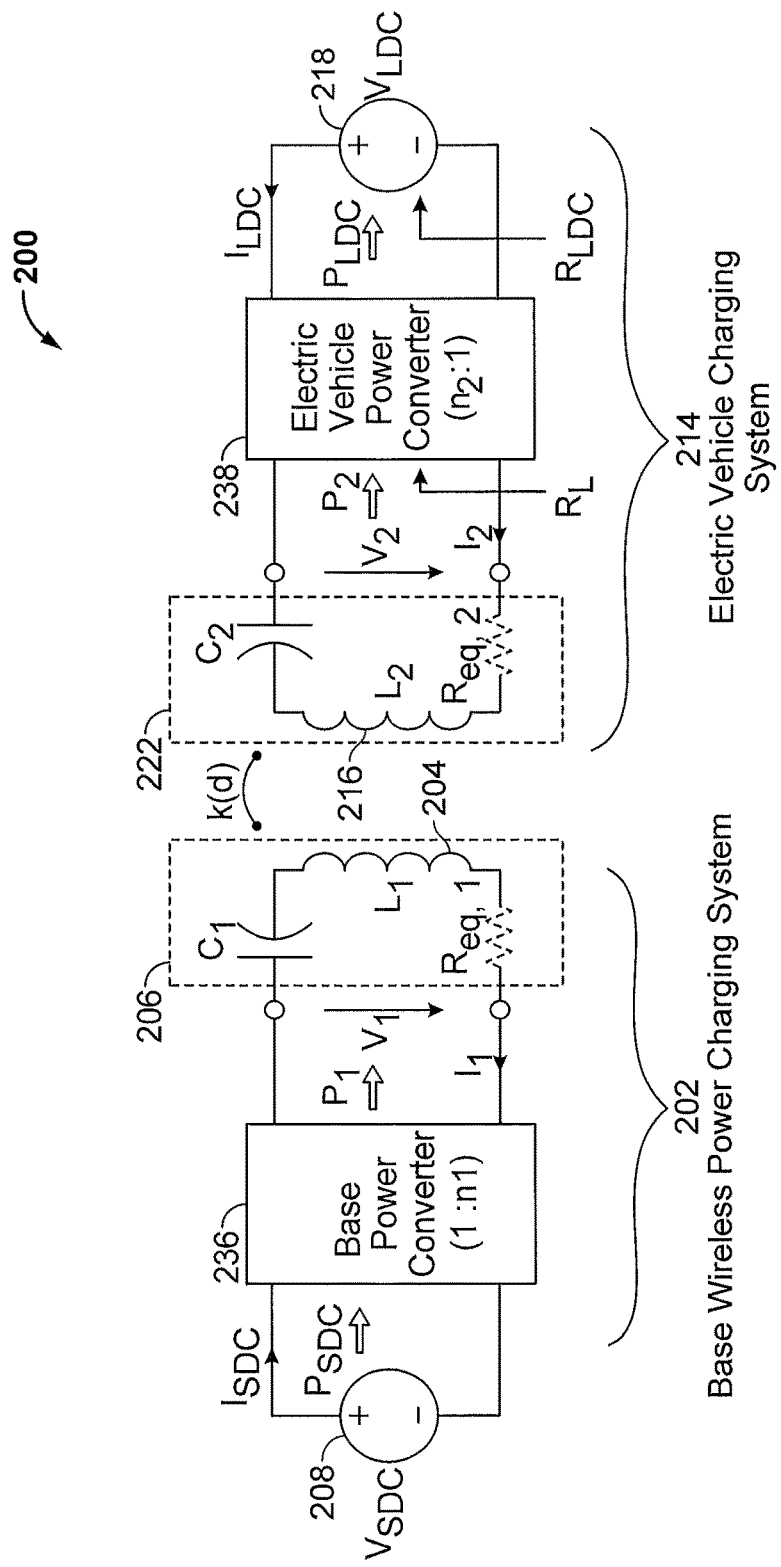
FIG. 2 is a schematic diagram of exemplary core components of a wireless power transfer system similar to that previously discussed in connection with FIG. 1, in accordance with some exemplary implementations.

FIG. 2 is a schematic diagram of exemplary core components of a wireless power transfer system 200 similar to that previously discussed in connection with FIG. 1, in accordance with some exemplary implementations. The wireless power transfer system 200 may include a base resonant circuit 206 including a base coupler 204 having an inductance $L_1$. The wireless power transfer system 200 further includes an electric vehicle resonant circuit 222 including an electric vehicle coupler 216 having an inductance $L_2$. Implementations described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle coupler 216 and the base coupler 204. Using resonant structures for coupling energy may be referred to as "magnetically coupled resonance," "electromagnetically coupled resonance," and/or "resonant induction." The operation of the wireless power transfer system 200 will be described based on power transfer from a base coupler 204 to an electric vehicle 112 (not shown), but is not limited thereto. For example, as discussed above, energy may be also transferred in the reverse direction.

With reference to FIG. 2, a power supply 208 (e.g., AC or DC) supplies power $P_{SDC}$ to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power $P_1$ to the base resonant circuit 206 including tuning capacitor $C_1$ in series with base coupler 204 to emit an electromagnetic field at the operating frequency. The series-tuned resonant circuit 206 should be construed as exemplary. In another implementation, the capacitor $C_1$ may be coupled with the base coupler 204 in parallel. In yet other implementations, tuning may be formed of several reactive elements in any combination of parallel or series topology. The capacitor $C_1$ may be provided to form a resonant circuit with the base coupler 204 that resonates substantially at the operating frequency. The base coupler 204 receives the power $P_1$ and wirelessly transmits power at a level sufficient to charge or power the electric vehicle. For example, the level of power provided wirelessly by the base coupler 204 may be on the order of kilowatts (kW) (e.g., anywhere from 1 kW to 110 kW, although actual levels may be or higher or lower).

The base resonant circuit 206 (including the base coupler 204 and tuning capacitor $C_1$) and the electric vehicle resonant circuit 222 (including the electric vehicle coupler 216 and tuning capacitor $C_2$) may be tuned to substantially the same frequency. The electric vehicle coupler 216 may be positioned within the near-field of the base coupler and vice versa, as further explained below. In this case, the base coupler 204 and the electric vehicle coupler 216 may become coupled to one another such that power may be transferred wirelessly from the base coupler 204 to the electric vehicle coupler 216. The series capacitor $C_2$ may be provided to form a resonant circuit with the electric vehicle coupler 216 that resonates substantially at the operating frequency. The series-tuned resonant circuit 222 should be construed as being exemplary. In another implementation, the capacitor $C_2$ may be coupled with the electric vehicle coupler 216 in parallel. In yet other implementations, the electric vehicle resonant circuit 222 may be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the base and electric vehicle couplers 204 and 216 and the tuning (anti-reactance) capacitors $C_1$ and $C_2$, respectively. The electric vehicle resonant circuit 222, including the electric vehicle coupler 216 and capacitor $C_2$, receives and provides the power $P_2$ to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power $P_{LDC}$ to the load 218. The power supply 208, base power converter 236, and base coupler 204 may be stationary and located at a variety of locations as discussed above. The electric vehicle load 218 (e.g., the electric vehicle battery unit), electric vehicle power converter 238, and electric vehicle coupler 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle coupler 216 to the base wireless power charging system 202 to feed power back to the grid. Each of the electric vehicle coupler 216 and the base coupler 204 may act as transmit or receive couplers based on the mode of operation.

While not shown, the wireless power transfer system 200 may include a load disconnect unit (LDU) (not known) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle coupler 216 to the electric vehicle power converter 238. Disconnecting the electric vehicle coupler 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base coupler 204 as further explained below.

As described above, in operation, during energy transfer towards an electric vehicle (e.g., electric vehicle 112 of FIG. 1), input power is provided from the power supply 208 such that the base coupler 204 generates an electromagnetic field for providing the energy transfer. The electric vehicle coupler 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle coupler 216 is located in the near-field coupling mode region of the base coupler 204 as further explained below.

As stated, an efficient energy transfer occurs by transferring energy via an magnetic near-field rather than via electromagnetic waves in the far field, which may involve substantial losses due to radiation into the space. When in the near-field, a coupling mode may be established between the transmit coupler and the receive coupler. The space around the couplers where this near-field coupling may occur is referred to herein as a near-field coupling mode region.

While not shown, the base power converter 236 and the electric vehicle power converter 238 if bidirectional may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle coupler 216 and base coupler 204 as described throughout the disclosed implementations may be referred to or configured as "conductor loops", and more specifically, "multi-turn conductor loops" or coils. The base and electric vehicle couplers 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a coupler (e.g., the base coupler 204 and capacitor $C_2$) as described above. As shown in FIG. 2, inductance may generally be the inductance of the coupler, whereas, capacitance may be added to the coupler to create a resonant structure at a desired resonant frequency. Accordingly, for larger size couplers using larger diameter coils exhibiting larger inductance, the value of capacitance needed to produce resonance may be lower. Inductance may also depend on a number of turns of a coil. Furthermore, as the size of the coupler increases, coupling efficiency may increase. This is mainly true if the size of both base and electric vehicle couplers increase. Furthermore a resonant circuit including a coupler and tuning capacitor may be designed to have a high quality (Q) factor to improve energy transfer efficiency. For example, the Q factor may be 300 or greater.

As described above, according to some implementations, coupling power between two couplers that are in the near-field of one another is disclosed. As described above, the near-field may correspond to a region around the coupler in which mainly reactive electromagnetic fields exist. If the physical size of the coupler is much smaller than the wavelength, inversely proportional to the frequency, there is no substantial loss of power due to waves propagating or radiating away from the coupler. Near-field coupling-mode regions may correspond to a volume that is near the physical volume of the coupler, typically within a small fraction of the wavelength. According to some implementations, magnetic couplers, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" couplers (e.g., dipoles and monopoles) or a combination of magnetic and electric couplers may be used.

Figure 3:
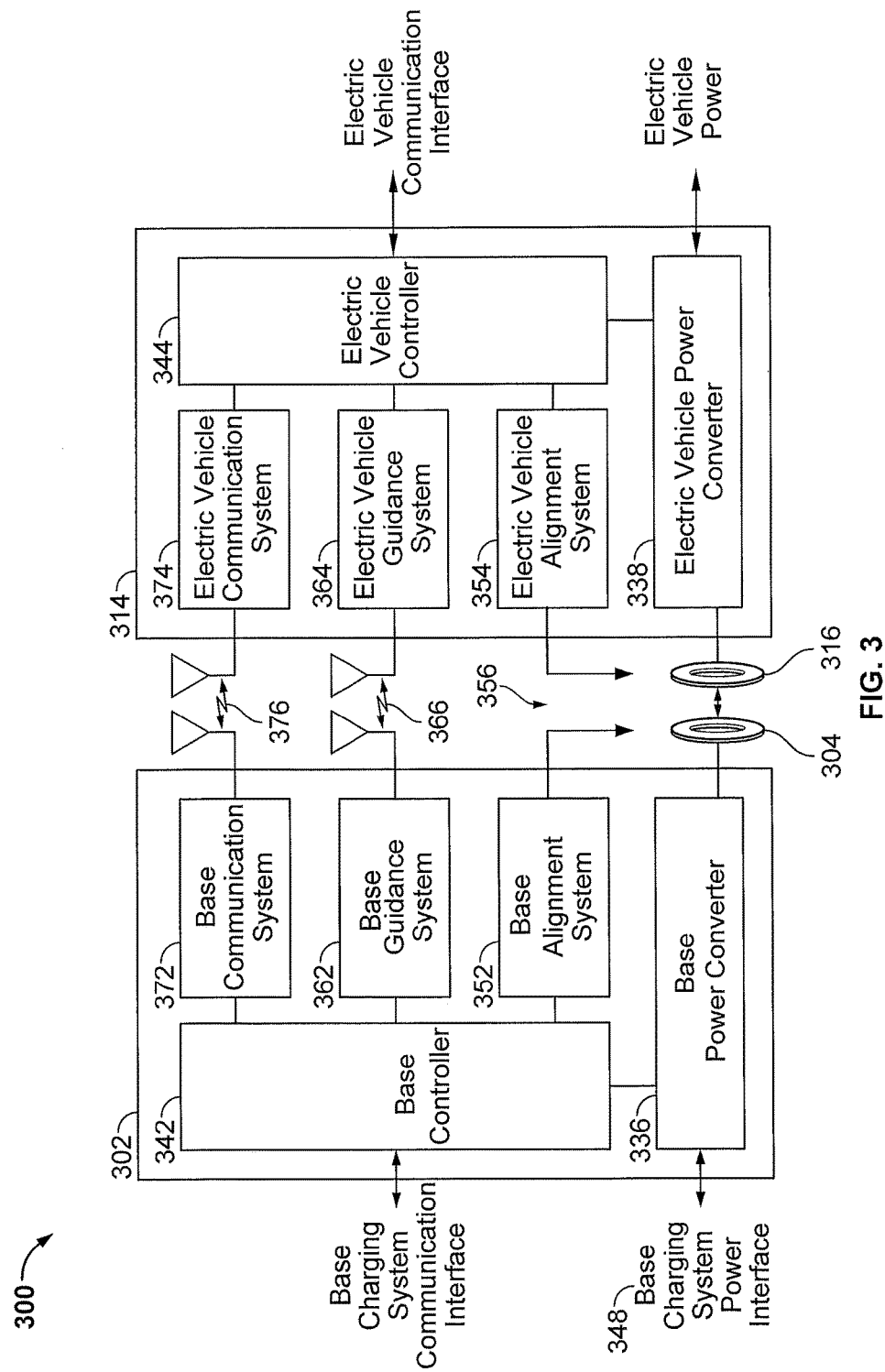
FIG. 3 is a functional block diagram showing exemplary core and ancillary components of the wireless power transfer system of FIG. 1.

FIG. 3 is a functional block diagram showing exemplary components of wireless power transfer system 300, which may be employed in wireless power transfer system 100 of FIG. 1 and/or that wireless power transfer system 200 of FIG. 2 may be part of. The wireless power transfer system 300 illustrates a communication link 376, a guidance link 366, using, for example, a magnetic field signal for determining a position or direction, and an alignment mechanism 356 capable of mechanically moving one or both of the base coupler 304 and the electric vehicle coupler 316. Mechanical (kinematic) alignment of the base coupler 304 and the electric vehicle coupler 316 may be controlled by the base alignment system 352 and the electric vehicle charging alignment system 354, respectively. The guidance link 366 may be capable of bi-directional signaling, meaning that guidance signals may be emitted by the base guidance system or the electric vehicle guidance system or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base coupler 304 at a frequency near or at the resonant frequency of the base resonant circuit 206 with reference to FIG. 2. The electric vehicle coupler 316, when in the near-field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle coupler 316 to a power signal suitable for charging a battery via the electric vehicle power interface.

The base wireless charging system 302 includes a base controller 342 and the electric vehicle charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication system 372 and electric vehicle communication system 374 may include subsystems or modules for specific application with separate communication channels and also for wirelessly communicating with other communications entities not shown in the diagram of FIG. 3. These communications channels may be separate physical channels or separate logical channels. As non-limiting examples, a base alignment system 352 may communicate with an electric vehicle alignment system 354 through communication link 376 to provide a feedback mechanism for more closely aligning the base coupler 304 and the electric vehicle coupler 316, for example via autonomous mechanical (kinematic) alignment, by either the electric vehicle alignment system 354 or the base alignment system 352, or by both, or with operator assistance as described herein. Similarly, a base guidance system 362 may communicate with an electric vehicle guidance system 364 through communication link 376 and also using a guidance link 366 for determining a position or direction as needed to guide an operator to the charging spot and in aligning the base coupler 304 and electric vehicle coupler 316. In some implementations, communications link 376 may comprise a plurality of separate, general-purpose communication channels supported by base communication system 372 and electric vehicle communication system 374 for communicating other information between the base wireless charging system 302 and the electric vehicle charging system 314. This information may include information about electric vehicle characteristics, battery characteristics, charging status, and power capabilities of both the base wireless charging system 302 and the electric vehicle charging system 314, as well as maintenance and diagnostic data for the electric vehicle. These communication channels may be separate logical channels or separate physical communication channels such as, for example, WLAN, Bluetooth, zigbee, cellular, etc.

In some implementations, electric vehicle controller 344 may also include a battery management system (BMS) (not shown) that manages charge and discharge of the electric vehicle principal and/or auxiliary battery. As discussed herein, base guidance system 362 and electric vehicle guidance system 364 include the functions and sensors as needed for determining a position or direction, e.g., based on microwave, ultrasonic radar, or magnetic vectoring principles. Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle couplers 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may include other ancillary systems such as detection and sensor systems (not shown). For example, the wireless power transfer system 300 may include sensors for use with systems to determine a position as required by the guidance system (362, 364) to properly guide the driver or the vehicle to the charging spot, sensors to mutually align the couplers with the required separation/coupling, sensors to detect objects that may obstruct the electric vehicle coupler 316 from moving to a particular height and/or position to achieve coupling, and safety sensors for use with systems to perform a reliable, damage free, and safe operation of the system. For example, a safety sensor may include a sensor for detection of presence of animals or children approaching the base and electric vehicle couplers 304, 316 beyond a safety radius, detection of metal objects located near or in proximity of the base or electric vehicle coupler (304, 316) that may be heated up (induction heating), and for detection of hazardous events such as incandescent objects near the base or electric vehicle coupler (304, 316).

The wireless power transfer system 300 may also support plug-in charging via a wired connection, for example, by providing a wired charge port (not shown) at the electric vehicle charging system 314. The electric vehicle charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle charging system 314, the wireless power transfer system 300 may use in-band signaling via base and electric vehicle couplers 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle couplers 304 and 316 may also be configured to act as wireless communication antennas. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base coupler 304. By way of example, a load sensing circuit monitors the current flowing to a power amplifier of the base power converter 336, which is affected by the presence or absence of active power receivers in the near-field coupling mode region of the base coupler 304. Detection of changes to the loading on the power amplifier may be monitored by the base controller 342 for use in determining whether to enable the base wireless charging system 302 for transmitting energy, to communicate with a receiver, or a combination thereof.

Figure 4:
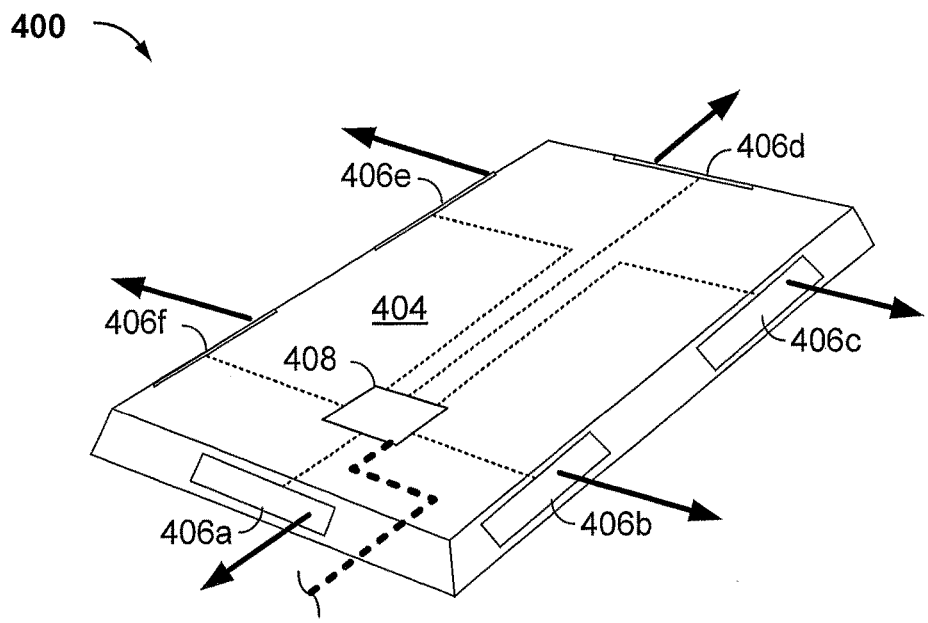
FIG. 4 is a schematic view of a living or moving object detection system integrated into a base pad of a wireless power transmitter, in accordance with some exemplary implementations.

FIG. 4 is a schematic view 400 of a living or moving object detection system integrated into a base pad 404 of a wireless power transmitter, in accordance with some exemplary implementations. As shown in FIG. 4, the base pad 404 may additionally include a plurality of radar modules 406a, 406b, 406c, 406d, 406e, and 406f each integrated into or mounted onto a surface of the base pad 404. In some implementations, each radar module may be configured to operate independently of the other radar modules such that signals generated by the other radar modules do not interfere with the operation of a particular radar module. Because the radar modules 406a-406f may be, but are not required to be, mounted on the sides of the base pad 404 (e.g., the module may be separate from the base pad 404), living object protection (LOP) coverage on all sides or along an entire perimeter of the base pad 404 may be provided. In some other implementations, the radar modules 406a-406f may be integrated just below a top surface of the base pad 404 such that the base pad 404 may be flush mounted into a surface. In some other implementations, the radar modules 406a-406f may be installed on a vehicle as either a vehicle-pad-integrated system or as a discrete system.

As shown in FIG. 4, the base pad 404 may additionally include a central processing unit 408 (e.g., a processor) connected to each of the radar modules 406a-406f, as depicted by the thin dashed lines. The processor 408 may be configured to receive radar data from the plurality of radar transceivers on the radar modules 406a-406f. As will be described in more detail below in connection with FIGS. 6-11, the processor 408 may utilize raw radar data from one or more of the radar modules 406a-406f, in isolation (e.g., considering raw radar data from only one radar module) or in combination (e.g., considering raw radar data from multiple radar modules in some aggregate fashion), to determine a presence of a moving or living object within an adjustable detection region, area or zone. Accordingly, the processor 408 and the plurality of radar modules 406a-406f may provide a "virtual electronic fence" around the base pad 404 for detecting any living or moving object in the detection region. In addition, the processor 408 may be configured to provide raw or processed radar data to the rest of the wireless electric vehicle charging (WEVC) system and receive status information or other data from the WEVC system. For such purposes, the processor 408 may be in communication with other portions of the WEVC system via a communications link, depicted by the heavy dotted line, at least to communicate an object detection trigger to the WEVC system for shutting down charging or for reducing an amount of power that is wirelessly transmitted by the base pad 404. This application additionally contemplates reusing the radar modules 406a-406f of the base pad 404 for vehicle presence detection and or for other functions, as will be described in more detail in connection with FIGS. 6-11 below, to reduce overall system complexity and cost, while providing increased functionality for the WEVC system. Although not explicitly shown in this application, the implementations described in connection with FIGS. 6-11 may alternatively be included in a vehicle-side radar detection system.

Figure 5:
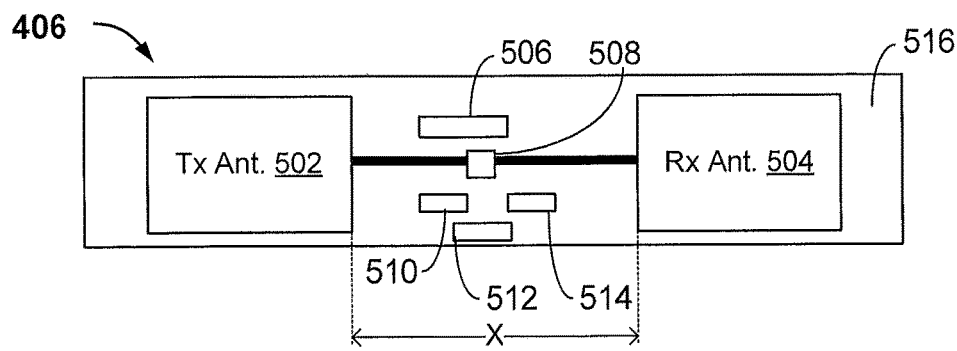
FIG. 5 is a schematic view of a radar module as shown in FIG. 4, in accordance with some exemplary implementations.

The radar modules 406a-406f will now be discussed in more detail in connection with FIG. 5. FIG. 5 is a schematic view of a radar module 406 as shown in FIG. 4, in accordance with some exemplary implementations. The radar module 406 may comprise a PCB 516. In some implementations, the PCB 516 may have a form factor of approximately 25 mm wide by 120 mm long, where the length may depend at least in part on a separation distance "X" between a transmit antenna 502 and a receive antenna 504 disposed on the PCB 516. However, the present application is not so limited and any dimensions may be utilized in accordance with a particular implementation. The separation distance "X" of the transmit antenna 502 from the receive antenna 504 may be based on a targeted or desired radar range and a desired or targeted width of the detection area. For example, greater separation distance "X" leads to a wider detection area, but tends to shorten the usable range (e.g., the length of the detection area extending away from the radar module). However, the overall behavior and performance of the module 406 may depend on the type and characteristics of the transmit and receive antennas utilized. In some other implementations, a single transmit/receive antenna may be contemplated at the expense of system sensitivity and potentially having to utilize a directional coupler circuit on the PCB 516.

The transmit antenna 502 and the receive antenna 504 may comprise ultra wide band (UWB) radar antennas operating in a frequency band of 1-10 GHz, although any type of UWB radar antenna operating in any associated frequency band may also be contemplated. The transmit antenna 502 and the receive antenna 504 may be configured to have omnidirectional transmit and receive patterns in the plane of operation.

The radar module 406 may additionally comprise a local processing unit 506, a UWB radar chip 508, interface circuitry 510, a connector 512, and a local power supply 514. The interface circuitry 510 may be configured to provide processing related to interfacing the radar module 406 with the central processor 408 of FIG. 4, for example. The UWB radar chip 508 may be configured to provide processing of raw radar data received from the receive antenna 504 or for transfer to the transmit antenna 502. The local power supply 514 may be configured to provide power to any of the chips or circuitry of the radar module 406. The connector 512 may be configured to provide the raw radar data from the radar module 406 to the central processing unit 408 previously described in connection with FIG. 4.

The radar module 406 may additionally comprise the optional local processing unit 506 configured to perform some level of local processing of raw radar data to be transmitted or that has been received by the transmit antenna 502 or the receive antenna 504, respectively. However, in at least some implementations, the central processing unit 408 previously described in FIG. 4 may perform substantially all processing of the raw radar data received from the radar module 406.

The radar module 406 may be configured to transmit radar signals via the transmit antenna 502, receive the reflected or modulated reflected (e.g., in the case of passive transponder use) radar signals via the receive antenna 504, and provide raw radar data to at least one of the local processing unit 506 of FIG. 5 and the central processing unit 408 of FIG. 4. Ultimately, the central processing unit 408 may be configured to determine, calculate, detect or provide information associated with an object detected in an adjustable detection area including but not limited to: a distance, velocity, direction to, or size of the detected object, as well as determination of one or more of a presence of a vehicle over the base pad, an estimated underbody height of a present vehicle, a precise position of the vehicle with respect to the base pad 404, and trigger information initiated by a user's gesture recognized through radar gesture recognition. Such determinations may be carried out according to one or more processing methods, as will be described in connection with FIGS. 6-11 below. Upon accurate detection of an object, the vehicle's presence, or a qualifying user's gesture, power to the base pad 404 may be initiated, discontinued, increased, or reduced to a lower level, depending on the particular determination or detection.

Figure 6:
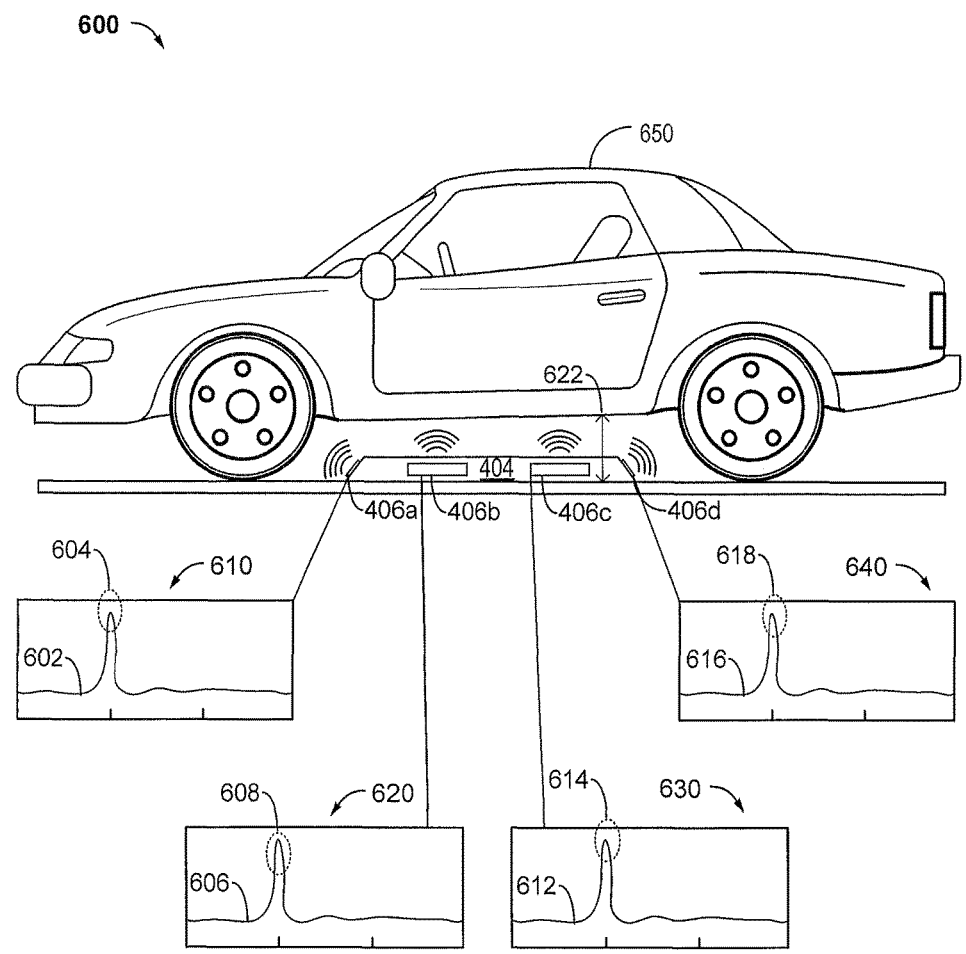
FIG. 6 illustrates a diagram of the base pad of FIG. 4 configured to determine an underbody height of a vehicle positioned over the base pad, in accordance with some exemplary implementations.

In some implementations, radar responses, re-modulations, or reflections may be detected and utilized to determine an underbody height of a vehicle positioned over the base pad 404 having the radar modules 406a-406f, as previously described in connection with FIGS. 4 and 5. FIG. 6 illustrates a diagram 600 of the base pad 404 of FIG. 4 configured to determine an underbody height of a vehicle 650 positioned over the base pad 404, in accordance with some implementations. As shown in FIG. 6, a chargeable electric vehicle 650 may be positioned over the base pad 404 comprising the plurality of radar modules 406a-406f (only 406a-406d shown for simplicity of illustration and explanation), as previously described in connection with FIG. 4. As shown, each of the radar modules 406a-406d (e.g., two or more modules) may be configured to transmit a radar signal. Each of the modules 406a-406d may be configured to transmit during a respective time interval such that radar signals transmitted from one of the modules 406a-406d will not interfere with operation of surrounding modules. In the alternative, each of the modules 406a-406d may transmit simultaneously on respective non-overlapping frequencies, such that radar signals transmitted from one of the modules 406a-406d will not interfere with operation of the surrounding modules.

The presence of the vehicle 650 may be determined by comparing the radar responses of each of the available radar modules 406a-406d. For example, if a strong static or slowly moving radar response, corresponding to a particular range of distances (e.g., 8 to 20 cm), is detected by each (or a majority) of the radar modules 406a-406d, it is highly probable that the vehicle 650 is located over the base pad 404. FIG. 6 additionally includes a plurality of charts 610, 620, 630 and 640 showing corresponding radar responses 602, 606, 612 and 616, as received by the radar modules 406a, 406b, 406c and 406d, respectively. The horizontal axis (x-axis) may indicate the passage of time since a radar signal was transmitted from a corresponding radar module, while the vertical axis (y-axis) may indicate a strength of a radar response received by that corresponding radar module. As shown, each of the radar responses 602, 606, 612 and 616 indicate respective heightened responses 604, 608, 614 and 618 occurring at substantially the same time (e.g., a same time of reception). Since the same time of reception of each of the radar responses 602, 606, 612 and 616 indicates the presence of an object located substantially the same distance from each of the spatially separated radar modules, the presence of the vehicle 650 may be determined or inferred. This vehicle presence detection information may be used by the WEVC system to start a communication with the vehicle or another WEVC system, to start WEVC coupling measurements, to inform an infrastructure server, controller, processor or computer about the arrival of the vehicle 650, or for any other purpose where determination of a presence of the vehicle 650 may be useful.

Figure 7:
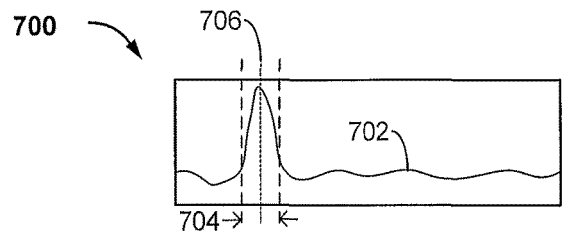
FIG. 7 shows a chart of an averaged radar response received from a plurality of the multiple radar modules of FIGS. 4 and 6 indicating the presence of a vehicle, in accordance with some exemplary implementations.

Related to the above-described vehicle presence detection, the underbody height 622 of the vehicle 650 (e.g., an underbody height value) may be estimated by averaging the positions determined by each of the available radar modules (e.g., the radar modules 406a-406d, as shown in FIGS. 4 and 6) as previously described. The determination of the vehicle's 650 underbody height 622 may be used to distinguish and discriminate movements of the vehicle 650 from movements of other objects around or below the vehicle 650. This may be desirable since movements of the vehicle 650 may cause false alarms of the LOP system. By knowing the underbody height 622, movements in a range (e.g., a predetermined range) of distances around and including the determined underbody height 622 may be filtered or filtered out, as illustrated in FIG. 7. FIG. 7 shows a chart 700 of an averaged radar response 702 of radar responses indicating the presence of the vehicle, received from each of multiple radar modules 406a-406d of FIGS. 4 and 6, in accordance with some exemplary implementations. Since the averaged response 702 shows the common peak 706, peaks, disturbances, or perturbations in the response of the radar modules 406a-406d may be filtered or filtered out of consideration in a range 704 surrounding the peak 706 if such a peak, disturbance or perturbation is detected by all, a majority, or a plurality of the radar modules 406a-406d substantially concurrently, depending on the implementation.

This information about movements of the vehicle may be useful to the WEVC system and other ancillary systems, such as foreign object (e.g., metal) detection (FOD) systems, since vehicle movements may cause false triggers of the FOD system. In addition, it may be desirable for the main power transfer system controller to regulate wireless power transmission levels based at least in part on vehicle movements in order to maintain constant power transfer which may be facilitated by using the vehicle presence and underbody height information delivered by the LOP system (e.g., the radar modules 406a-406d).

Figure 8:
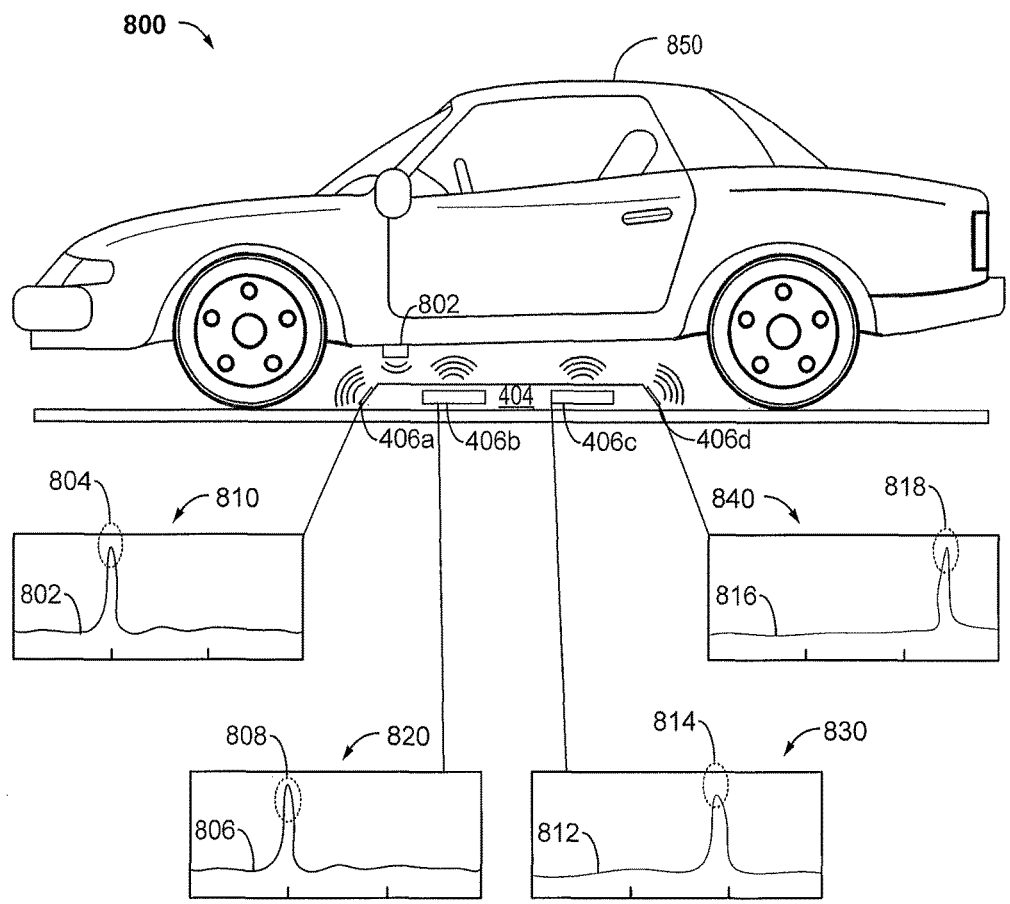
FIG. 8 illustrates a diagram of the base pad of FIG. 4 configured to determine a position of a vehicle positioned over the base pad, in accordance with some exemplary implementations.

In some implementations, where at least one passive or active radar transponder on the vehicle is utilized, a more precise position of the vehicle may be determined utilizing the radar modules 406a-406d of the LOP system. FIG. 8 illustrates a diagram 800 of the base pad 404 of FIG. 4 configured to determine a position of a vehicle 850 positioned over the base pad 404, in accordance with some exemplary implementations. The vehicle 850 may be substantially the same as the vehicle 650 of FIG. 6 except further including a radar transponder 802. In some implementations, the transponder 802 is a passive transponder that reflects a radar signal transmitted from a radar module (e.g., one of the radar modules 406a-406d), and modulates the reflection according to one or more protocols. In some implementations, the re-modulation includes shifting an impedance of the transponder or shifting a phase or frequency of the received radar signal before re-transmission. In yet other implementations, a passive mechanical solution may be utilized where a small reflector (not shown) is rotated or moved to cause small variations in the distance between the small reflector and the radar modules 406a-406d, which may be detected as a Doppler shift in the reflected radar response. In some other implementations, the transponder 802 is an active radar transponder, which actively re-transmits a radar signal in response to receiving a trigger radar signal from at least one of the radar modules 406a-406d. Such an active transponder implementation may be more costly to design and manufacture than some of the above-mentioned passive transponder solutions.

FIG. 8 additionally includes a plurality of charts 810, 820, 830 and 840 showing corresponding radar signals 802, 806, 812 and 816 as respectively received by the radar modules 406a, 406b, 406c and 406d. As previously described, the received radar signals 802, 806, 812 and 816 may be radar signals actively transmitted by the transponder 802 or may be passively modulated version of radar signals from the transponder 802. The horizontal axis (x-axis) may indicate the passage of time, while the vertical axis (y-axis) may indicate a strength of a radar response received by that corresponding radar module. As shown, the radar responses 802, 806, 812 and 816 may each have a heightened response 804, 808, 814 and 818 characterized by the applied transponder modulation occurring at respective times. The time at which a particular heightened radar response is received by a particular radar module is a function of a distance between the transponder 802 and that particular radar module. For example, the heightened responses 804 and 808 for radar modules 406a and 406b, respectively, are shown to occur at approximately the same time since the transponder 802 is located approximately the same distance from each of the radar modules 406a and 406b. Since the radar modules 406c and 406d are located farther from the transponder 802, the heightened responses 814 and 818 for radar modules 406c and 406d occur at relatively later times as compared to heightened responses 804 and 808.

Accordingly, a local processing unit 506 in each of the radar modules 406a-406d (or the processor 408 within the base pad 404, not shown in FIG. 8) may be configured to determine the respective distances to the transponder 802. Since the transponder 802 is fixed to a particular location on the vehicle 850, a position of the vehicle 850 may be determined using a plurality of these determined respective distances, e.g., by triangulation methods. The precision of this calculated position increases if the vehicle 850 is located substantially over the base pad 404, e.g., already roughly located in a substantially aligned position for wireless power transfer. If the vehicle 850 is still a few meters away from this aligned position, these position calculations may be less precise. In some implementations, this vehicle position information may be used within the WEVC system to assist the driver in guiding the vehicle 850 to the charging spot and in aligning the vehicle pad with the base pad 404. In some implementations, together with a vehicle underbody height estimate, position information can be used to indirectly compute a coupling coefficient estimate for the WEVC system.

In some implementations where the transponder 802 is employed, the transponder 802 may be further configured to transmit an identifier message (ID) associated with the transponder 802, or more generally with the vehicle 850 (e.g., the message comprises an identifier of the vehicle 850), to the base pad 404 by modulating the reflected radar signal using a suitable data modulation scheme, e.g., frequency shift keying, amplitude shift keying, etc. For the previously described passive mechanical transponder implementation, a motor rotating or moving the small reflector may vary the rotational speed or the position of a small reflector according to a digital ID stream for transmission. For example, it is estimated that transmission speeds of 10-20 bits per second may be achieved, of course, limited by the update rate of the radar modules 406a-406d. Transmission of the ID by the transponder 802 may facilitate a pairing process between the vehicle 850 and the base pad 404, especially where multiple collocated parking lots, spots and/or base pads are present.

Figure 9:
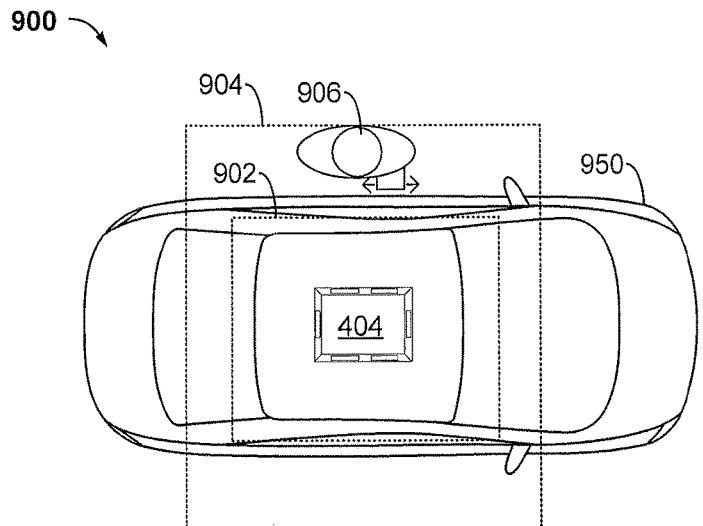
FIG. 9 illustrates a diagram of a vehicle positioned over the base pad of FIG. 4 configured to shut down wireless power transfer in response to identifying a gesture of a user, in accordance with some exemplary implementations.

In yet other implementations, coexistence issues (e.g., electromagnetic interference) may exist between the WEVC system and keyless entry systems of the vehicle. Using an advanced LOP system, such as that described in this application, to trigger user controlled shut down of the WEVC system may help to resolve such coexistence issues. FIG. 9 illustrates a diagram 900 of a vehicle 950 positioned over the base pad 404 of FIG. 4 configured to shut down wireless power transfer in response to identifying a predetermined physical gesture of a user, in accordance with some exemplary implementations. As shown in FIG. 9, the vehicle 950 may be positioned for wireless power transfer over the base pad 404. The LOP system comprising the radar modules in or on the base pad 404 may be configured with at least two detection areas: 1) an LOP detection area 902, and 2) a gesture recognition area 904. When a person 906 approaches the vehicle 950 and enters the gesture recognition area 904 while the vehicle 950 is being charged, an immediate shutdown of the WEVC system may be initiated when the person 906 performs a predetermined physical gesture with a portion of his or her body (e.g., a hand, foot, arm or leg). The LOP system (e.g., the base pad 404, the processor 408 in the base pad 404, or a processing module 506 in one or more of the radar modules 406a-406f of the base pad 404) may be configured to recognize or identify this specific gesture outside the LOP detection area 902 but inside the gesture recognition area 904 and reduce a level of wireless power or shut down the WEVC wireless power transmission. With the WEVC system inactive or transmitting a reduced level of power wirelessly, the keyless entry system (not shown) in the vehicle 950 may operate normally and the person 906 may gain access to the vehicle 950 or to one or more other features provided by the keyless entry system. In such implementations, any other random movements in the gesture recognition area 904 may be filtered or filtered out and the WEVC system may continue to operate, unless a movement is detected within the normal LOP area, as defined by the LOP detection area 902. In some implementations, such a special gesture may also be a trigger for activating the keyless entry system in addition to, or in the alternative of, touching a door handle, for example.

Figure 10:
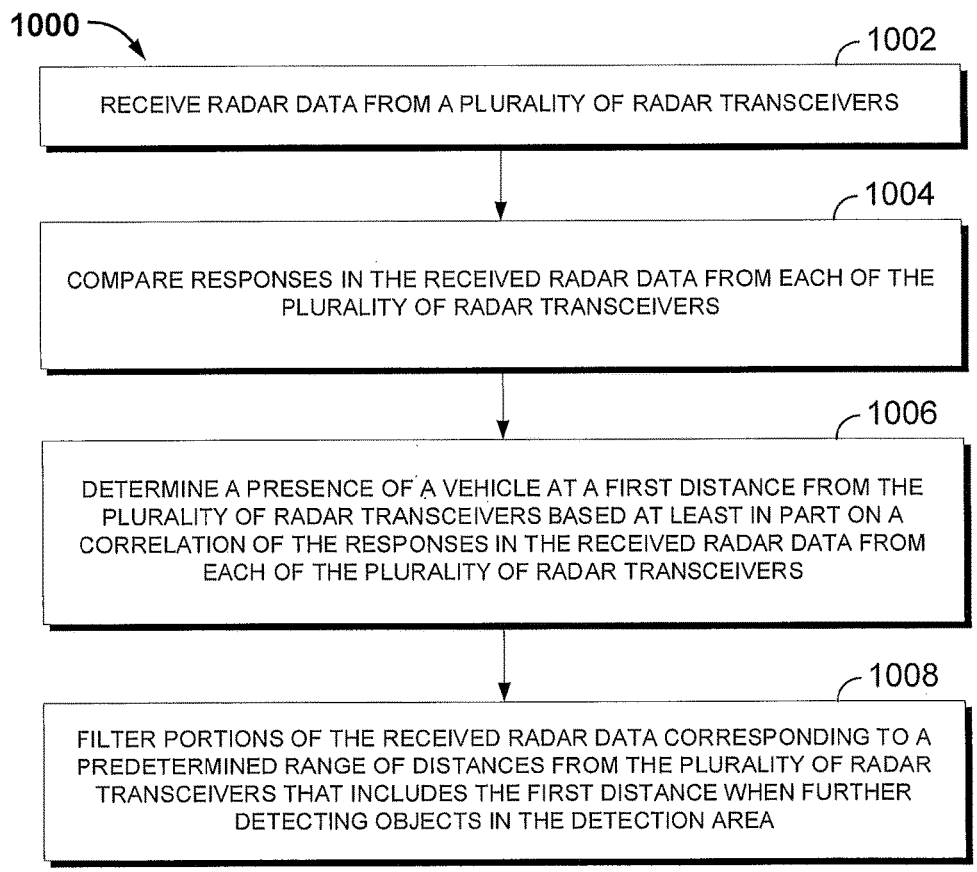
FIG. 10 is a flowchart depicting a method for detecting objects in a detection area near a wireless power transfer system, in accordance with some implementations.

FIG. 10 is a flowchart 1000 depicting a method for detecting objects in a detection area near a wireless power transfer system, in accordance with some implementations. The method of flowchart 1000 is described herein with reference to processor 408 and plurality of radar modules 406a-406f as previously described in connection with FIGS. 4-9. In some implementations, one or more of the blocks in flowchart 1000 may be performed by a processor such as, for example, the processor 408 of FIG. 4. Although the method of flowchart 1000 is described herein with reference to a particular order, in various implementations, blocks herein may be performed in a different order, or omitted, and additional blocks may be added.

The flowchart 1000 may start with block 1002, which includes receiving radar data from a plurality of radar transceivers. For example, as previously described in connection with FIG. 4, the processor 408 may receive radar data associated with a received radar signal from at least one of the plurality of radar modules 406a-406f, each comprising a transmit antenna and a receive antenna (e.g., such as the transmit antenna 502 and the receive antenna 504 shown in FIG. 5).

The flowchart 1000 may then advance to block 1004, which includes comparing responses in the received radar data from each of the plurality of radar transceivers. For example, as previously described in connection with FIG. 6, the processor 408 of FIG. 4 may compare, for radar data received from each of the plurality of radar transceivers, the heightened response (e.g., responses 604, 608, 614 and 618 within received radar data 602, 606, 612 and 616, respectively) within the respective received radar data.

The flowchart 1000 may then advance to block 1006, which includes determining a presence of a vehicle at a first distance from the plurality of radar transceivers based at least in part on a correlation of the responses in the received radar data from each of the plurality of radar transceivers. For example, as previously described in connection with FIG. 6, the processor 408 may determine that a vehicle is present when the heightened response in each of the received radar data are found in substantially the same locations within respective received radar data, indicating that an object is located at the same distance (e.g., the first distance) from each radar transceiver that received radar data in a particular scan. It is highly likely that a vehicle is positioned over each of these radar transceivers when such a result is detected.

The flowchart 1000 may then advance to block 1008, which includes filtering portions of the received radar data corresponding to a predetermined range of distances from the plurality of radar transceivers that includes the first distance when further detecting objects in the detection area. For example, as previously described in connection with FIG. 7, the processor 408 may determine a predetermined range of distances 704 from the plurality of radar transceivers that includes the determined first distance 706 where a vehicle is present and filter portions of the received radar data within the range 704 to reduce or eliminate the occurrence of false positives caused by movement or presence of the vehicle itself rather than of an object under or adjacent to the vehicle.

Figure 11:
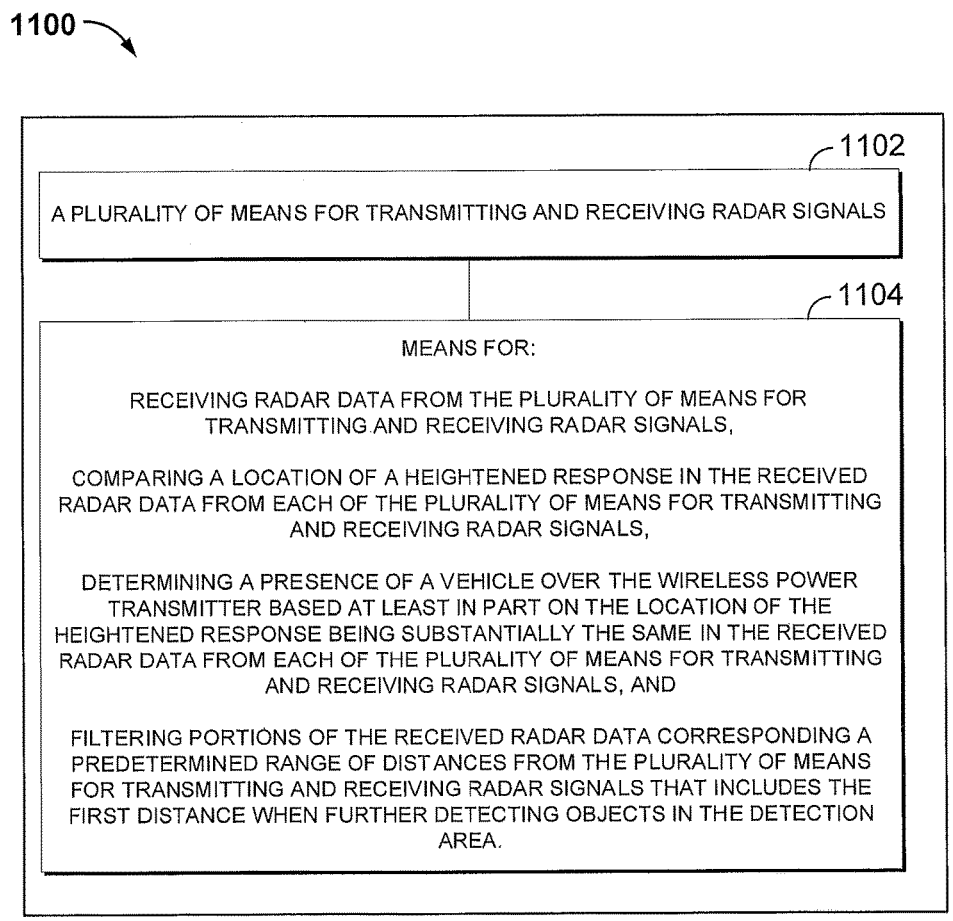
FIG. 11 is a functional block diagram of an apparatus for detecting objects in a detection area near a wireless power transfer system, in accordance with some exemplary implementations.

FIG. 11 is a functional block diagram of an apparatus 1100 for detecting objects in a detection area near a wireless power transfer system, in accordance with some exemplary implementations. The apparatus 1100 includes a plurality of means 1102 for transmitting and receiving radar signals. In some implementations, the plurality of means 1102 for transmitting and receiving radar signals may be integrated into a wireless power transmitter and each may comprise the transmit antenna 502 and the receive antenna 504 of FIG. 5. For example, the means 1102 may transmit radar signals by receiving the signals to be transmitted at an input and electromagnetically radiating the radar signals wirelessly away from the means 1102. In further example, the means 1102 may receive radar signals by electromagnetically receiving the radar signals as radiated or reflected from some disparate location providing the received radar signal at an output of the means 1102.

The apparatus 1100 further includes means 1104 for: receiving radar data from the plurality of means 1102 for transmitting and receiving radar signals, comparing responses in the received radar data from each of the plurality of means 1102 for transmitting and receiving radar signals, determining a presence of a vehicle at a first distance from the plurality of means 1102 for transmitting and receiving radar signals based at least in part on a correlation of the responses in the received radar data from each of the plurality of means 1102 for transmitting and receiving radar signals, and filtering portions of the received radar data corresponding to a predetermined range of distances from the plurality of means 1102 for transmitting and receiving radar signals that includes the first distance when further detecting objects in the detection area.

In some implementations, the means 1104 may be implemented by the processor 408 in FIG. 4. For example, the processor 408 may receive the radar data from the plurality of transceivers 406a-406f either once, at random times, or periodically. The processor 408 may store or cause to be stored the radar data in one or more memory locations (not shown) for further comparison. The processor 408 may attempt to identify a peak in each of the stored radar data and compare the location of those peaks in each of the stored radar data. Where the location of the peaks in each of the stored radar data substantially coincide with one another (e.g., the locations of the peaks within respective stored radar data from each of the plurality of transceivers 406a-406f are correlated with one another), the processor 408 may provide an indication, either at an output of the processor or in a memory location (not shown), that a vehicle is present. The processor 408 may further determine a first distance from any of the plurality of transceivers 406a-406f to the vehicle by performing one or more mathematical operations on an indication of the location of the peaks within the radar data (e.g., a time of reception of the peaks in the radar data) and a speed of propagation of the electromagnetically radiated radar data such that the first distance may be determined. The processor 408 may then discard, attenuate and/or filter portions of subsequently received radar data that are within a range of locations in the subsequently received radar data that includes the location of the peaks, in the previous received radar data, used to indicate the vehicles presence (e.g., the distance at which the vehicle has been calculated or determined to be located utilizing the previously received radar signals). Furthermore, the above descriptions may describe or be further supplemented by any method, operation, algorithm or process as previously described in connection with any of FIGS. 1-10.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps, of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus for detecting objects in a detection area near a wireless power transfer system, the apparatus comprising:
a plurality of radar transceivers, each transceiver configured to transmit and receive radar signals; and
at least one processor configured to:
receive radar data from the plurality of radar transceivers,
compare responses in the received radar data from each of the plurality of radar transceivers,
determine respective underbody height values of a vehicle at a first distance from the plurality of radar transceivers based at least in part on the responses in the received radar data from each of the plurality of radar transceivers, and
filter portions of the received radar data corresponding to movement within a predetermined range of distances from the plurality of radar transceivers that includes the first distance when further detecting objects in the detection area.

2. The apparatus of claim 1, wherein a correlation of the responses in the received radar data from each of the plurality of radar transceivers comprises a correlation in a time of reception of the responses in the received radar data from each of the plurality of radar transceivers.

3. The apparatus of claim 1, wherein the first distance corresponds to the underbody height of the vehicle, and the processor is further configured to:
average the respective underbody height values for each of the plurality of radar transceivers.

4. The apparatus of claim 1, wherein the processor is further configured to determine a position of the vehicle based on a radar signal received by the plurality of radar transceivers from a radar transponder fixed to the vehicle.

5. The apparatus of claim 4, wherein the processor is configured to determine the position of the vehicle by:
receiving the radar signal from the radar transponder at each of the plurality of radar transceivers,
determining a respective distance between the radar transponder and each of the plurality of radar transceivers based on at least one characteristic of the received radar signal, and
determining the position of the vehicle based at least in part on the respective determined distances between the radar transponder and each of the plurality of radar transceivers.

6. The apparatus of claim 4, wherein the received radar signal comprises a modulated version of a radar signal transmitted from at least one of the plurality of radar transceivers.

7. The apparatus of claim 1, wherein the processor is further configured to receive a message comprising an identifier of the vehicle from a radar transponder fixed to the vehicle.

8. The apparatus of claim 1, wherein the processor is further configured to:
detect a predetermined physical gesture based on the received radar data from at least one of the plurality of radar transceivers, and
reduce a level of wireless power transferred by the wireless power transfer system in response to detecting performance of the predetermined physical gesture.

9. A method for detecting objects in a detection area near a wireless power transfer system, the method comprising:
receiving radar data from a plurality of radar transceivers,
comparing responses in the received radar data from each of the plurality of radar transceivers,
determining respective underbody height values of a vehicle at a first distance from the plurality of radar transceivers based at least in part on the responses in the received radar data from each of the plurality of radar transceivers, and
filtering portions of the received radar data corresponding to movement within a predetermined range of distances from the plurality of radar transceivers that includes the first distance when further detecting objects in the detection area.

10. The method of claim 9, wherein a correlation of the responses in the received radar data from each of the plurality of radar transceivers comprises a correlation in a time of reception of the responses in the received radar data from each of the plurality of radar transceivers.

11. The method of claim 9, wherein the first distance corresponds to an underbody height of the vehicle, and further comprising:
averaging the respective underbody height values for each of the plurality of radar transceivers.

12. The method of claim 9, further comprising determining a position of the vehicle based on a radar signal received by the plurality of radar transceivers from a radar transponder fixed to the vehicle.

13. The method of claim 12, wherein determining the position of the vehicle comprises:
receiving the radar signal from the radar transponder at each of the plurality of radar transceivers,
determining a respective distance between the radar transponder and each of the plurality of radar transceivers based on at least one characteristic of the received radar signal, and
determining the position of the vehicle based at least in part on the respective determined distances between the radar transponder and each of the plurality of radar transceivers.

14. The method of claim 12, wherein the received radar signal comprises a modulated version of a radar signal transmitted from at least one of the plurality of radar transceivers.

15. The method of claim 9, further comprising receiving a message comprising an identifier of the vehicle from a radar transponder fixed to the vehicle.

16. The method of claim 9, further comprising:
detecting a predetermined physical gesture based on the received radar data from at least one of the plurality of radar transceivers, and
reducing a level of wireless power transferred by the wireless power transfer system in response to detecting performance of the predetermined physical gesture.

17. A non-transitory, computer-readable medium comprising code that, when executed, causes an apparatus to:
receive radar data from a plurality of radar transceivers,
compare responses in the received radar data from each of the plurality of radar transceivers,
determine respective underbody height values of a vehicle at a first distance from the plurality of radar transceivers based at least in part on the responses in the received radar data from each of the plurality of radar transceivers, and
filter portions of the received radar data corresponding to movement within a predetermined range of distances from the plurality of radar transceivers that includes the first distance when further detecting objects in the detection area.

18. The medium of claim 17, wherein a correlation of the responses in the received radar data from each of the plurality of radar transceivers comprises a correlation in a time of reception of the responses in the received radar data from each of the plurality of radar transceivers.

19. The medium of claim 17, wherein the first distance corresponds to an underbody height of the vehicle, and the code, when executed, further causes the apparatus to:
averaging the respective underbody height values for each of the plurality of radar transceivers.

20. The medium of claim 17, wherein the code, when executed, further causes the apparatus to determine a position of the vehicle based on a radar signal received by the plurality of radar transceivers from a radar transponder fixed to the vehicle.

21. The medium of claim 20, wherein the code, when executed, further causes the apparatus to determine the position of the vehicle by:
receiving the radar signal from the radar transponder at each of the plurality of radar transceivers, determining a respective distance between the radar transponder and each of the plurality of radar transceivers based on at least one characteristic of the received radar signal, and determining the position of the vehicle based at least in part on the respective determined distances between the radar transponder and each of the plurality of radar transceivers.

22. The medium of claim 20, wherein the received radar signal comprises a modulated version of a radar signal transmitted from at least one of the plurality of radar transceivers.

23. The medium of claim 17, wherein the code, when executed, further causes the apparatus to receive a message comprising an identifier of the vehicle from a radar transponder fixed to the vehicle.

24. The medium of claim 17, wherein the code, when executed, further causes the apparatus to:
  detect a predetermined physical gesture based on the received radar data from at least one of the plurality of radar transceivers, and
  reduce a level of wireless power transferred by the wireless power transfer system in response to detecting performance of the predetermined physical gesture.

25. An apparatus for detecting objects in a detection area near a wireless power transfer system, the apparatus comprising:
  a plurality of means for transmitting and receiving radar signals; and
  means for:
    receiving radar data from the plurality of means for transmitting and receiving radar signals,
    comparing responses in the received radar data from each of the plurality of means for transmitting and receiving radar signals,
    determining respective underbody height values of a vehicle at a first distance from the plurality of means for transmitting and receiving radar signals based at least in part on the responses in the received radar data from each of the plurality of means for transmitting and receiving radar signals, and
    filtering portions of the received radar data corresponding to movement within a predetermined range of distances from the plurality of means for transmitting and receiving radar signals that includes the first distance when further detecting objects in the detection area.

26. The apparatus of claim 25, wherein a correlation of the responses in the received radar data from each of the plurality of means for transmitting and receiving radar signals comprises a correlation in a time of reception of the responses in the received radar data from each of the plurality of means for transmitting and receiving radar signals.

27. The apparatus of claim 25, wherein the first distance corresponds to an underbody height of the vehicle, the apparatus further comprising:
  means for averaging the respective underbody height values for each of the plurality of means for transmitting and receiving radar signals.

28. The apparatus of claim 25, further comprising means for determining a position of the vehicle based on a radar signal received by the plurality of means for transmitting and receiving radar signals from a radar transponder fixed to the vehicle.

29. The apparatus of claim 28, further comprising:
  means for receiving the radar signal from the radar transponder at each of the plurality of means for transmitting and receiving radar signals;
  means for determining a respective distance between the radar transponder and each of the plurality of means for transmitting and receiving radar signals based on at least one characteristic of the received radar signal; and
  means for determining the position of the vehicle based at least in part on the respective determined distances between the radar transponder and each of the plurality of means for transmitting and receiving radar signals.

30. The apparatus of claim 25, further comprising:
  means for detecting a predetermined physical gesture based on the received radar data from at least one of the plurality of means for transmitting and receiving radar signals, and
  means for reducing a level of wireless power transferred by the wireless power transfer system in response to detecting performance of the predetermined physical gesture.

* * * * *